United States Patent [19]

Craig

[11] Patent Number: 5,213,694
[45] Date of Patent: May 25, 1993

[54] WATER TREATMENT CONTROL SYSTEM FOR TREATING COOLING TOWER MAKEUP WATER

[75] Inventor: Marshall Craig, St. Petersburg, Fla.

[73] Assignee: American Hydro Systems, Inc., St. Petersburg, Fla.

[21] Appl. No.: 865,329

[22] Filed: Apr. 8, 1992

[51] Int. Cl.$^5$ .................................................. C02F 1/00
[52] U.S. Cl. ........................................ 210/744; 62/85; 62/188; 62/310; 137/14; 137/101.25; 137/101.27; 137/907; 137/909; 210/86; 210/97; 210/123; 210/136; 210/167; 210/198.1; 210/749; 210/808; 261/DIG. 11
[58] Field of Search ............... 137/101.27, 101.25, 137/14, 93, 907, 909; 210/86, 97, 121, 123, 127, 136, 169, 198.1, 206, 143, 739, 744, 749, 167, 805, 808, 167, 248, 764; 62/49.2, 85, 183, 188, 310, 311; 60/912; 261/DIG. 11

[56] References Cited

U.S. PATENT DOCUMENTS

| | | | |
|---|---|---|---|
| 2,869,831 | 1/1959 | Brockelsby | 137/93 |
| 3,292,650 | 12/1966 | Bird et al. | 137/93 |
| 3,627,032 | 12/1971 | Glad et al. | 62/310 |
| 3,628,663 | 12/1971 | Derham et al. | 261/DIG. 11 |
| 3,976,220 | 8/1976 | de Kanter | 210/169 |
| 4,259,269 | 3/1981 | Flowers | 210/198.1 |
| 4,460,008 | 7/1984 | O'Leary et al. | 137/93 |
| 4,738,541 | 4/1988 | Weber | 366/152 |
| 4,813,240 | 3/1989 | Hon | 261/DIG. 46 |
| 4,830,757 | 5/1989 | Lynch et al. | 210/86 |
| 4,836,239 | 6/1989 | Kinkead | 137/413 |
| 5,057,229 | 10/1991 | Schulenburg | 210/744 |
| 5,145,585 | 9/1992 | Coke | 261/DIG. 11 |

Primary Examiner—Joseph W. Drodge
Attorney, Agent, or Firm—Ronald P. Kananen

[57] ABSTRACT

An apparatus and method for controlling the amount and concentration of make-up water and chemicals introduce into the recirculating water of a cooling tower system. A float operated make-up valve controls the addition of make-up water to the tower. As make-up water is added to the tower a vacuum is produced at an injector valve which draws chemicals from a chemical holding tank into the make-up water, thereby allowing precise control of the chemical concentration in the make-up liquid. Further, a bleed valve is provided which is responsive to the vacuum produced at the injector valve and bleeds a portion of the recirculating water to waste.

28 Claims, 3 Drawing Sheets

WATER TREATMENT CONTROL SYSTEM FOR TREATING COOLING TOWER MAKEUP WATER

FIELD OF THE INVENTION

This invention relates to a water treatment control system and, more particularly, to a method and apparatus for controlling the amount and concentration of make-up water and chemicals introduced into recirculating water of a cooling tower system.

BACKGROUND OF THE INVENTION

Many different types of water cooling tower systems are known in the art. In a typical cooling tower system, water is recirculated past a heat exchange mechanism and a cooling mechanism and is collected in a basin or reservoir located at the base of the tower. As recirculating water is lost due to evaporation during the cooling process, make-up water must be added to the system. In addition, as water evaporates, the concentration of corrosive solids present in the recirculating water increases. Accordingly, in some instances, it is desirable to bleed off a portion of the recirculating water to reduce the concentration of solids present in the recirculating water. Further, chemicals are added to the recirculating water for any of a number of reasons including the prevention of corrosion. It is important that the concentration of chemicals in the recirculating water be constant and controlled in order to prevent corrosion and scaling. Prior water treatment systems are costly, complex and subject to considerable maintenances.

One such prior water treatment system is electrically controlled. In this type of system, a water meter with an electrical contact head measures the amount of make-up water that has been added to the cooling tower. After a certain amount of make-up water passes through the meter, an electric switch mounted on the meter head is activated. This electrical switch then activates an adjustable reset timer, which, in turn, operates a chemical feed pump and an electrically operated solenoid bleed valve. The chemical feed pump is independently adjusted to deliver the desired chemical quantity based on the amount of water added to the tower. The amount of water bled to waste from the recirculating water is controlled by a manual hand valve on the solenoid bleed valve and is proportional to the of amount of water circulating through the system. This system is expensive due to costly electrical meters, switches, and valves and is subject to considerable maintenance due to failure of the switches, meters, valves, diaphragms, etc.

Another prior water treatment system is a feed and bleed system which employs a conductivity probe to control the chemical concentration in the recirculating water. The conductivity probe senses a decrease in the electrical resistance of the recirculating water in the cooling tower due to an increase in the amount of dissolved solids in the recirculating water. After a specific conductivity value is sensed, a controller for the probe activates an electrical circuit, which, in turn, activates a chemical feed valve and an electrically operated solenoid bleed valve. The chemical feed valve is adjusted to control the amount of chemicals added to the recirculating water. The bleed valve, once activated, operates to bleed a portion of the recirculating water to waste until the water resistance increases to a pre-set value. At this point, the conductivity probe controller deactivates the electric circuit, which, in turn, deactivates the bleed valve and chemical feed valve.

The addition of make-up water is controlled separately from the addition of chemicals and operation of the bleed valve. When the water in the basin decreases below a set value, a valve and sensing mechanism causes make-up water be added to the system until the water level in the basin increases above a set point. This system is even more expensive than the electrically controlled system described above due to costly sensors and is also subject to considerable maintenance. In addition, because the chemical feed is controlled separately from make-up water feed, chemicals may be introduced into the recirculating water while no make-up water is being added, or alternatively, the addition of make-up water may continue while no chemicals are being added. As a result, the chemical concentration in the recirculating water is inaccurate and poorly mixed.

Thus it is a problem in the prior art to provide an accurate, well mixed, chemical dosage system for small and medium sized cooling towers. It is also a problem in the prior art to provide a controlled bleed for small and medium sized cooling towers. In addition, it is a problem in the prior art to provide an inexpensive and low maintenance way to maintain a minimal chemical dosage and save on water usage in a cooling tower system.

SUMMARY OF THE INVENTION

It is an object of the present invention to provide a method and apparatus for providing an accurate, well mixed, chemical dosage system for a cooling tower system.

It is a further object of the present invention to provide a controlled bleed for a cooling tower system.

It is a further object of the present invention to provide a chemical dosage system for a cooling tower system that does not require electrical control or expensive sensors.

It is a further object of this present invention to provide an inexpensive, easy to use, and low maintenance system to maintain minimum chemical dosages in a cooling tower system and save on water usage.

Additional objects, advantages and novel features of the invention will be set forth in the description which follows, and will become apparent to those skilled in the art upon reading this description or practicing the invention. The objects and advantages of the invention may be realized and attained by the invention of appended claims.

To achieve the foregoing and other objects, in accordance with the present invention, as embodied and broadly described herein, the water cooling tower system of this invention may comprise a water cooling tower having means for recirculating a liquid therethrough; means for adding make-up liquid to the tower in order to compensate for recirculated liquid lost to evaporation; means for sensing and controlling the level of liquid in the cooling tower; the means for adding make-up liquid to the tower being responsive to the liquid level sensing and controlling means, whereby when a minimum level of liquid is sensed by the liquid level sensing means make-up liquid is added to the tower by the means for adding make-up liquid; vacuum responsive chemical additive means connected to the means for adding make-up liquid to the tower for creating a vacuum which draws chemicals into the make-up liquid as the make-up liquid is added to the tower; and vacuum responsive liquid removal means for bleeding a portion of said liquid to waste.

BRIEF DESCRIPTION OF DRAWINGS

The accompanying drawings, which are incorporated in, and form part of, the specification, illustrate an embodiment of the present invention and, together with the description serve to explain the principle of the invention. In the drawings.

DETAILED DESCRIPTION OF PREFERRED EMBODIMENT

Reference will now be made in detail to the preferred embodiment of the invention, an example of which is illustrated in the accompanying drawings.

Figure 1:
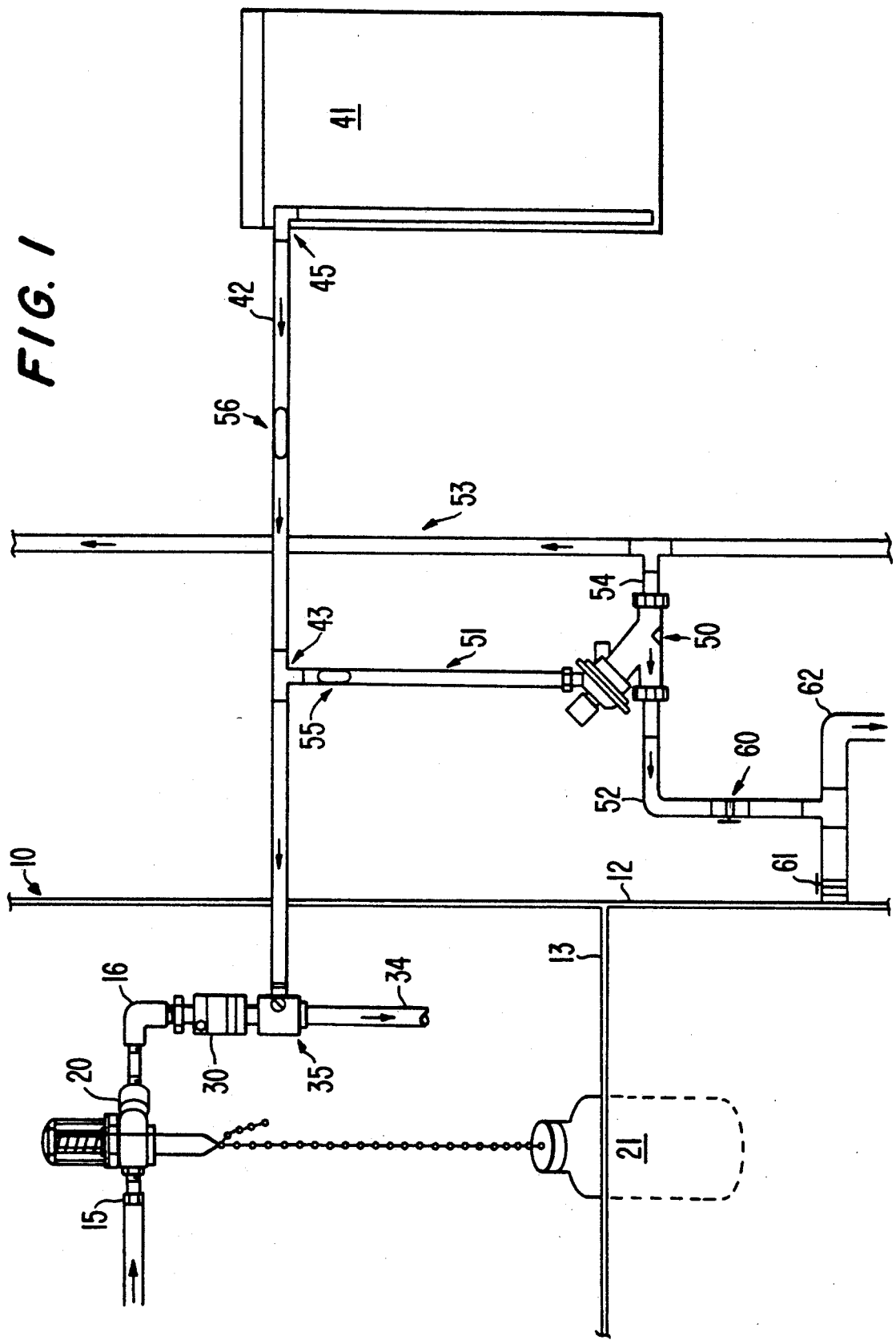
FIG. 1 is a schematic view of the water treatment control system of the present invention.

Illustrated in FIG. 1 is the water treatment system of the present invention. A base 12 of a cooling tower 10 is filled with water as indicated at 13. Recirculating water or other liquid leaves the tower through a water outlet (not shown), is passed through a suitable heat exchange mechanism, and is returned to the tower through a recirculating water return line 53 and a water inlet (not shown).

Due to evaporation of recirculating water from the tower 10 during the cooling process, make-up water is added to the tower 10 through a make-up water inlet 15. Means are provided for sensing the level of liquid in the tower and for controlling the inflow of make-up water added to the tower. Preferably, such means comprise an adjustable non-modulating float operated make-up valve indicated generally at 20, the operation of which will be described in detail later. It is necessary to add chemicals or other additives to the recirculating water in tower 10 for any number of reasons, including, preventing corrosion of the system, disinfecting the system, softening the water in the system, dissolving solids in system, or preventing microbiological growth in the system. Vacuum responsive chemical additive means are provided for controlling the inflow of chemicals into the recirculating water; preferably, such means include a vacuum responsive injection valve 35 connected to a chemical holding tank 41 through a chemical feedline 42. The chemicals are supplied from the chemical holding tank 41, pass through the chemical feedline 42 and mix with make-up water at an injection valve 35 before entering the tank through a make-up water and chemical mixture inlet 34.

Figure 2:
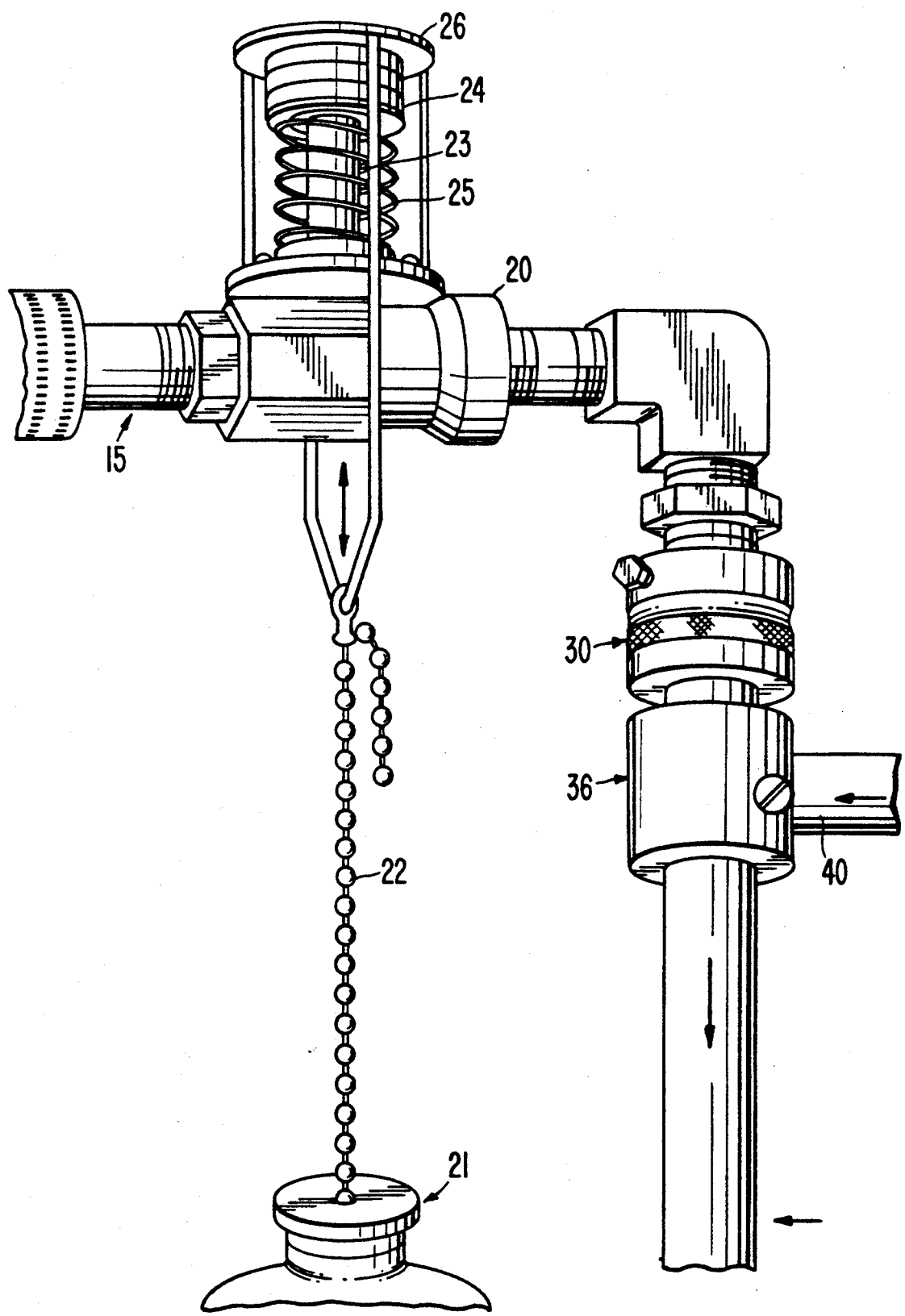
FIG. 2 is an enlarged detailed view of the adjustable float operated make-up valve.

As shown in FIG. 2, the adjustable float operated make-up valve 20 is comprised of a float 21 which floats in the water 13 contained in the tower 10, a make-up valve 26 which is preferably of the pilot-operated diaphragm-type and a chain 22 which connects the float 21 to the make-up valve 26. The make-up valve 26 is comprised of a magnetic plunger 23, permanent magnets 24, a spring 25, pile port (not shown), and diaphragm (not shown).

The float operated make-up valve 20 is responsive to the water level 13 in the tower 10 and its operation is as follows. As the water level 13 in the tower 10 decreases, the downward movement of the float 21 pulls the permanent magnets 24 of the make-up valve 26 over the magnetic plunger 23. The plunger 23 is pulled off the pile port in the center of the diaphragm releasing pressure on the diaphragm, allowing the diaphragm to be lifted off the make-up water inlet and allowing make-up water to flow through the inlet. As the water level 13 in the tower 10 rises, the float 21 rises, the permanent magnets 24 move upward, and the magnetic plunger 23 drops back over the pile port. Pressure builds up on top of the diaphragm through a small bleed hole. When the pressure equalizes, the spring 25 closes the diaphragm and prevents all inflow of make-up water through the make-up water inlet 15. Many different materials can be used for the components of this system. Preferably, the float 21 is made out of polyethylene, the diaphragm and seals are made out of BUMA-A rubber and the valve body is made out of brass. The level differential of this float operated make-up valve system is approximately three inches. The float operated make-up valve, thus, allows accurate and precise regulation of the water level in the tower 10.

The operation of the system for controlling the inflow of make-up water and chemicals and outflow of recirculating water to waste will now be described. When the adjustable float 21 of the float operated make-up valve 20 drops below a predetermined minimum level, the make-up valve 26 is opened in the manner described above and make-up water is added to the tower 10 at a constant rate. The addition of make-up water produces a vacuum at the injector 35. This vacuum draws chemicals out of the chemical holding tank 41 through the chemical feedline 42 where they blend with the make-up water at the injector 35. The amount of chemicals added in proportion to make-up water added is controlled by a metering jet 45 in the chemical feedline 42.

The make-up water and chemical mixture then flows into the tower 10 through the make-up water and chemical mixture inlet 34. The chemical concentration is constant and well mixed because chemicals are added to the system in a constant proportion to the amount of make-up water added and only when make-up water is added. A check valve 56 is provided in vacuum line 42 to prevent the vacuum line 42 from draining during the period when n make-up water is being added. A siphon breaker 30 is provided between the make-up water inlet 15 and the injection valve 35 to prevent backflow of chemicals into the make-up water line 16. Preferably, the injector 35 is made out of polypropylene. The chemical concentration does not fluctuate because the situation does not arise where make-up water is introduced in the absence of chemicals, or vice versa. Further, this system allows for accurate and precise control of the dosage of chemicals in make-up water without any complicated and expensive electrical control.

As water is evaporated from the recirculating water solids may accumulate in the water that can lead to corrosion. It is, therefore, desirable to discharge a portion of the recirculating water to waste in order to lower the level of solids in the recirculating water and maintain a desired concentration. Accordingly, this invention further provides means for a controlled bleed of recirculating water from the tower. Preferably, such means comprise a bleed valve responsive to the vacuum produced at the injector valve.

Figure 3:
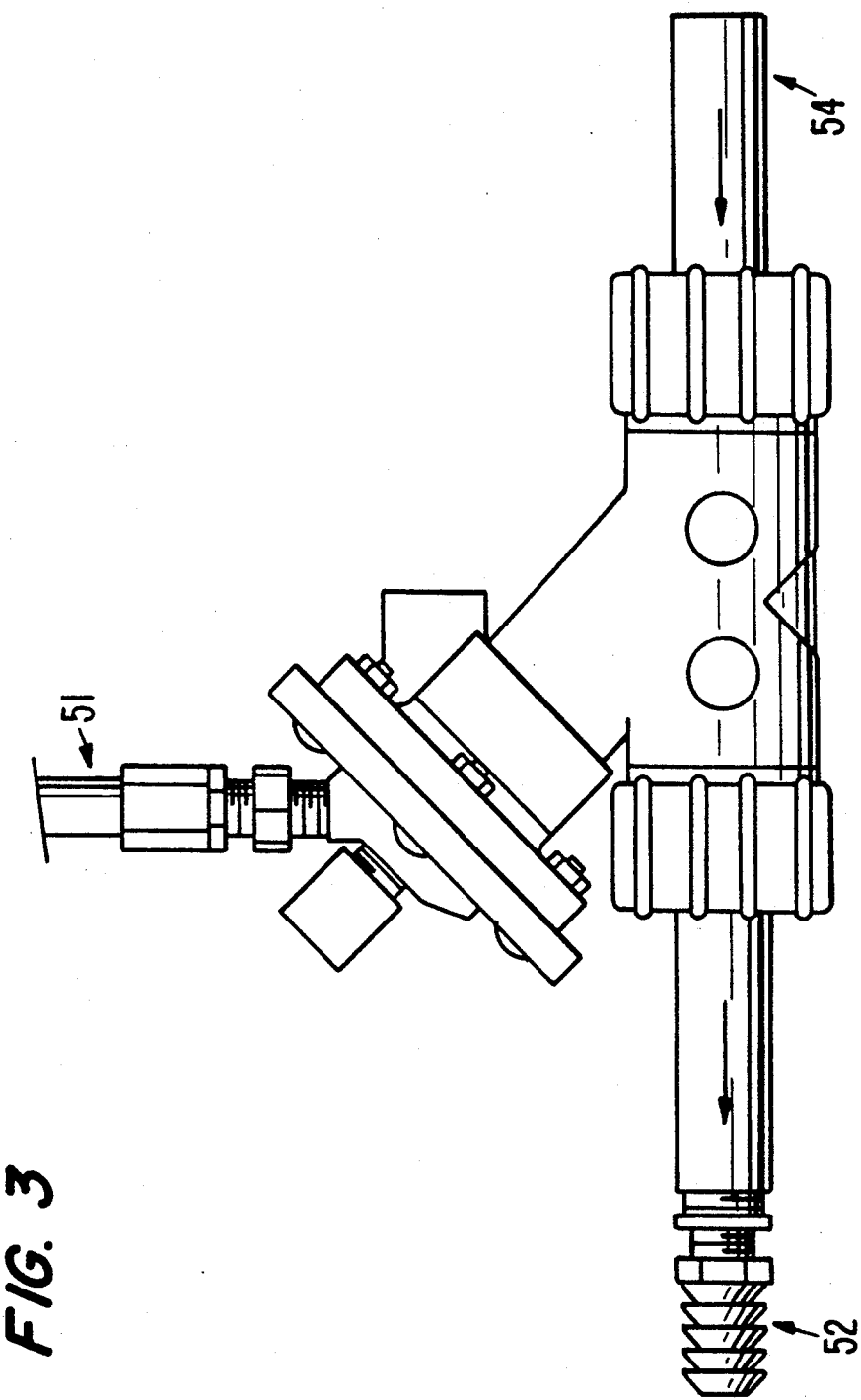
FIG. 3 is an enlarged view of the bleed valve of the present invention.

As shown in FIGS. 1 and 3, a vacuum line 51 branches off the chemical feedline 42 at a T-joint 43. At a bleed valve 50, the vacuum from the injector 35 draws water from a recirculating water return line 53 through the bleed valve 50 to a waste line 52 and 62. A check valve 55 in the vacuum line 51 prevents chemicals from the chemical feedline 42 from entering the bleed valve 50. The bleed valve 50 is capable of handling deionized water as well as acids, caustic substances, coolants and harsh chemicals that would corrode metal valves. Accordingly, it is preferred that the valve 50 be made of corrosion resistance materials. The valve body can be molded from glass filled engineering thermoplastic. The diaphragm within the valve is made out of BUMA-N on nylon and all seals are ethylene/propylene. Accordingly, corrosive elements never touch a corrodible surface.

A manual flow control valve 60 is provided to adjust the bleed so that a definite percentage of recirculating water is lost in relation to the amount of make-up water added. Because recirculating water is bled from the system only when make-up water and chemicals are added to the system, the concentration of the water is constant and accurate. The tower 10 is also provided with valve 61 which allows the tower 10 to be drained directly to waste.

The foregoing description of a preferred embodiment of the invention has been presented for purposes of illustration and description. It is not intended to be exhausted or to limit the invention to the precise form disclosed. Many modifications and variations are possible in light of the above teaching. The embodiment was chosen and described in order to best explain the principles of the invention and its practical application to thereby enable others skilled in the art to best utilize the invention and various embodiments and with various modifications as are suited to the particular use contemplated. It is intended that the scope of the invention only be limited by the claims appended hereto.

What is claimed:

1. A water cooling tower system which comprises:
   a water cooling tower having means for recirculating a liquid therethrough;
   means for adding make-up liquid to the tower in order to compensate for recirculated liquid lost to evaporation;
   means for sensing and controlling the level of liquid in the cooling tower, said means for adding make-up liquid to said tower being responsive to said liquid level sensing and controlling means, whereby when a minimum level of liquid is sensed by said liquid level sensing means, make-up liquid is added to said tower by said means for adding make-up liquid; and
   vacuum responsive chemical additive means connected to said means for adding make-up liquid to said tower for controlledly adding chemicals to the make-up liquid in response to a vacuum created as a result of the make-up liquid being added to the tower.

2. A water cooling tower system as defined in claim 1, wherein said vacuum responsive chemical additive means includes an injector valve in which a vacuum is produced as make-up liquid passes through it.

3. A water cooling tower system as defined in claim 2, wherein said vacuum responsive chemical additive means is connected to a chemical holding tank whereby when said vacuum is produced in said injector valve, chemicals are drawn from said chemical holding tank into said injector valve and blend with said make-up liquid in said injector valve before entering said tower.

4. A water cooling tower system as defined in claim 3, further including a metering jet connected between said vacuum responsive chemical additive means and said chemical holding tank for controlling the amount of chemicals drawn from said chemical holding tank.

5. A water cooling tower as defined in claim 3, further comprising means for preventing chemicals drawn from said holding tank from reentering said holding tank when n make-up liquid is being added.

6. A water cooling tower as defined in claim 5, wherein said means for preventing comprises a check valve.

7. A water cooling tower as defined in claim 1, which further includes means for providing a controlled bleed of recirculating liquid to waste.

8. A water cooling tower as defined in claim 7, wherein said means for providing a controlled bleed of recirculating liquid comprises a bleed valve responsive to said vacuum created as the make-up liquid is added to the tower.

9. Water cooling tower as defined in claim 8, wherein said bleed valve is further connected to a manual flow control valve to control the amount of liquid bled to waste.

10. A water cooling tower system as defined in claim 9, wherein said vacuum responsive chemical additive means is connected to a chemical holding tank whereby when said vacuum is produced in said injector valve chemicals are drawn from said chemical holding tank, into said injector valve and blend with said make-up liquid before entering said tower.

11. A water cooling tower system as defined in claim 10, further including a metering jet connected between said vacuum responsive chemical additive means and said chemical holding tank for controlling the amount of chemicals added.

12. A water cooling tower as defined in claim 10, further comprising a check valve for preventing chemicals drawn from said holding tank from reentering said holding tank when no make-up liquid is being added.

13. A water cooling tower as defined in claim 7, further comprising means for preventing chemicals from entering said bleed means.

14. A water cooling tower as defined in claim 13, wherein said means for preventing comprises a check valve.

15. A water cooling tower system as defined in claim 14, wherein said vacuum responsive chemical additive means includes an injector valve in which a vacuum is produced as make-up liquid passes through it.

16. A water cooling tower system as defined in claim 1, wherein said liquid level sensing and controlling means includes a non-modulating float operated make-up valve.

17. A water cooling tower system as defined in claim 16, wherein said non-modulating float operated make-up valve comprise a float which when the liquid level in said tower decreases below a set level pulls magnets over a magnetic plunger lifting said magnetic plunger off a diaphragm in the valve allowing make-up liquid to flow therethrough.

18. A water cooling tower system as defined in claim 17, wherein when the liquid level in said tower increases above a set point said float rises lifting said magnets upwards releasing said magnetic plunger which then seals the diaphragm and valve allowing no make-up liquid to flow therethrough.

19. A water cooling tower system which comprises:
   a water cooling tower having means for recirculating a liquid therethrough;

means for adding make-up liquid to the tower in order to compensate for recirculated liquid lost to evaporation;

means for sensing and controlling the level of liquid in the cooling tower, said means for adding make-up liquid to said tower being responsive to said liquid level sensing and controlling means, whereby when a minimum level of liquid is sensed by said liquid level sensing means, make-up liquid is added to said tower by said means for adding make-up liquid;

vacuum responsive chemical additive means connected to said means for adding make-up liquid to said tower for controlledly adding chemicals to the make-up liquid in response to a vacuum created as a result of the make-up liquid being added to the tower; and vacuum responsive liquid removal means for bleeding a portion of said recirculate liquid to waste.

20. A water cooling tower system as defined in claim 19, wherein said vacuum responsive liquid removal means includes a bleed valve, whereby said vacuum created as make-up liquid is added to the tower draws liquid from said means to recirculate liquid through said bleed valve t waste.

21. A water cooling tower as defined in claim 20, further comprising a check valve for preventing said chemicals from entering said bleed valve.

22. A water cooling tower system as defined in claim 20, wherein said vacuum responsive liquid removal means further includes a manual flow control valve for controlling the amount of liquid bled to waste in proportion to the amount of make-up liquid added to the system.

23. A method of controlling the chemical concentration in a water treatment system comprising a cooling tower containing a liquid which is recirculated therethrough comprising the steps of:

sensing the liquid level in the cooling tower;

adding make-up liquid to the cooling tower in response to the liquid level in the cooling tower dropping below a predetermined level;

producing a vacuum in response to said adding make-up liquid;

adding chemicals to said make-up liquid in response to said vacuum; and bleeding a portion of said recirculated liquid to waste.

24. The method defined in claim 23, wherein said steps of sensing the liquid level in the cooling tower and adding liquid to the cooling tower are carried out by a non-modulating float operated make-up valve.

25. The method defined in claim 24, wherein a float of said non-modulating float operated make-up valve senses a minimum level of liquid in the cooling tower, and, in response, the make-up valve of said non-modulating float operated make-up valve opens and make-up liquid is added to the cooling tower.

26. The method defined in claim 23, wherein said step of producing a vacuum occurs at an injector valve in which a vacuum is produced as make-up liquid passes through it.

27. The method defined in claim 23, wherein said step of adding chemicals to the make-up liquid occurs as chemicals are drawn through a metering jet from a chemical holding tank by said vacuum into said injector valve and blended with said make-up liquid.

28. The method defined in claim 23, wherein said step of bleeding a portion of said recirculating liquid to waste is carried out by a bleed valve responsive to said vacuum produced in response to adding make-up liquid.

* * * * *